(12) United States Patent
Freimuth et al.

(10) Patent No.: US 9,143,580 B2
(45) Date of Patent: Sep. 22, 2015

(54) BROKERING AND PROVISIONING IN HIGH-SPEED NETWORKS

(75) Inventors: Douglas M. Freimuth, New York, NY (US); Vasileios Pappas, Elmsford, NY (US); Sumedh W. Sathaye, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 13/548,442

(22) Filed: Jul. 13, 2012

(65) Prior Publication Data

US 2014/0330973 A1 Nov. 6, 2014

(51) Int. Cl.
| | |
|---|---|
| G06F 15/173 | (2006.01) |
| H04L 29/08 | (2006.01) |
| H04B 10/27 | (2013.01) |
| H04J 14/02 | (2006.01) |
| H04L 29/06 | (2006.01) |

(52) U.S. Cl.
CPC ............... *H04L 67/32* (2013.01); *H04B 10/27* (2013.01); *H04J 14/0227* (2013.01); *H04L 69/10* (2013.01)

(58) Field of Classification Search
CPC ................... H04L 29/08072; H04L 29/08144; H04L 29/06
See application file for complete search history.

(56) References Cited

U.S. PATENT DOCUMENTS

| | | | | |
|---|---|---|---|---|
| 4,542,497 | A * | 9/1985 | Huang et al. ................ | 370/411 |
| 6,463,454 | B1 * | 10/2002 | Lumelsky et al. ............ | 718/105 |
| 6,578,068 | B1 * | 6/2003 | Bowman-Amuah .......... | 709/203 |
| 6,631,134 | B1 * | 10/2003 | Zadikian et al. ......... | 370/395.21 |
| 6,681,232 | B1 * | 1/2004 | Sistanizadeh et al. ........... | 1/1 |
| 7,076,552 | B2 * | 7/2006 | Mandato ...................... | 709/226 |
| 7,221,945 | B2 * | 5/2007 | Milford et al. ............. | 455/452.1 |
| 7,254,645 | B2 * | 8/2007 | Nishi ........................... | 709/249 |

(Continued)

FOREIGN PATENT DOCUMENTS

| | | |
|---|---|---|
| KR | 2005062706 A | 7/2005 |
| KR | 20050062706 A | 7/2005 |

(Continued)

OTHER PUBLICATIONS

Varela, et al., "Ant Colony Optimisation for Virtual-Wavelength-Path Routing and Wavelength Allocation," IEEE Congress of Evolutionary Computation, CEC, Jul. 6, 1999, pp. 1809-1816.

(Continued)

*Primary Examiner* — David X Yi
*Assistant Examiner* — Atta Khan
(74) *Attorney, Agent, or Firm* — Yee & Associates, P.C.; Jennifer R. Davis

(57) ABSTRACT

Network resources are provisioned within an application broker according to aggregated requests in an optical network. Resource requests are sorted to form sorted resource requests. The sorted resource requests are sorted according to destinations of the resource requests. The sorted resource requests are aggregated to form aggregated resource requests. Resource allocation is requested for each of the aggregated resource requests from a network border controller based on requirements of the set of set of aggregated resource requests. A set of allocated resources is received from the network border controller. The set of allocated resources is based on requirements of the aggregated resource requests. For each of the aggregated resource requests, network transmissions network receptions are executed utilizing associated allocated resources.

18 Claims, 7 Drawing Sheets

(56) References Cited

U.S. PATENT DOCUMENTS

| | | | |
|---|---|---|---|
| 7,394,985 B1* | 7/2008 | Wang et al. | 398/75 |
| 7,587,453 B2* | 9/2009 | Bhrara et al. | 709/204 |
| 7,602,807 B2* | 10/2009 | Zadikian et al. | 370/468 |
| 7,984,152 B2* | 7/2011 | Anschutz et al. | 709/226 |
| 8,126,330 B2* | 2/2012 | Wisseman | 398/83 |
| 8,149,439 B2* | 4/2012 | Morales et al. | 358/1.15 |
| 8,156,216 B1* | 4/2012 | Error | 709/224 |
| 8,239,560 B2* | 8/2012 | Lee et al. | 709/231 |
| 2002/0109880 A1* | 8/2002 | Mukherjee et al. | 359/128 |
| 2003/0120822 A1 | 6/2003 | Langrind et al. | |
| 2004/0230578 A1* | 11/2004 | Graves et al. | 707/9 |
| 2005/0177749 A1 | 8/2005 | Ovadia | |
| 2005/0198247 A1 | 9/2005 | Perry et al. | |
| 2005/0216590 A1 | 9/2005 | Aubin et al. | |
| 2009/0147792 A1* | 6/2009 | Anschutz et al. | 370/395.21 |
| 2010/0135661 A1* | 6/2010 | Youn et al. | 398/68 |
| 2010/0150558 A1* | 6/2010 | Wisseman | 398/79 |
| 2010/0332262 A1* | 12/2010 | Horvitz et al. | 705/4 |
| 2011/0081147 A1 | 4/2011 | Lee et al. | |
| 2013/0347068 A1* | 12/2013 | Elleboe et al. | 726/3 |
| 2014/0244609 A1* | 8/2014 | Dong | 707/706 |
| 2014/0304543 A1* | 10/2014 | Ilyas et al. | 713/401 |

FOREIGN PATENT DOCUMENTS

| | | | |
|---|---|---|---|
| WO | 2007016942 A1 | | 2/2007 |
| WO | WO 2007016942 A1 * | | 2/2007 |

OTHER PUBLICATIONS

Wang, et al. "c-Through: Part-time Optics in Data Centers," SIGCOMM '10, Aug. 30-Sep. 10, 2010, 12 pages.

Balasubramian, et al. NetQoPE: A Model-driven Network QoS Provisioning Engine for Distributed Real-time and Embedded Systems, IEEE Real-Time and Embedded Technology and Applications Symposium, Apr. 22-24, 2008, 10 pages.

Network Aware Resource Broker (NARB) and Resource Computation Element (RCE) Architecture, Version 2.1b, retrieved on Oct. 12, 2012 from https://wiki.internet2.edu/confluence/download/attachments/19074/narb-rce-architecture-v2.1b.pdf?version=1, University of Southern California (USC) Information Sciences Institute (ISI), Apr. 2008, 11 pages.

U.S. Appl. No. 13/492,205, filed Jun. 8, 2012, 41 pages.

Office Action dated Mar. 10, 2015, regarding U.S. Appl. No. 13/492,205, 19 pages.

Notice of Allowance dated Jun. 22, 2015, regarding USPTO U.S. Appl. No. 13/492,205, 5 pages.

* cited by examiner

BROKERING AND PROVISIONING IN HIGH-SPEED NETWORKS

This invention was made with Government support under Contract No. W911QX-10-C-0094 awarded by Defense Advanced Research Projects Agency (DARPA). The Government has certain rights in the invention.

BACKGROUND

1. Field

The disclosure relates generally to a computer implemented method, a computer program product, and a data processing system for provisioning optical network connections. More specifically the disclosure relates to a computer implemented method, a computer program product, and a data processing system for provisioning connections according to aggregated requests in an optical network.

2. Description of the Related Art

For purposes of the following descriptions, a communications network can be generally defined as a collection of network nodes and end nodes, or end stations, interconnected through communications links. A network node can be characterized as a data processing system that provides certain functions within the network, such as routing of messages between itself and its adjacent, or neighboring, nodes, selection of routes for messages to be transmitted between two nodes, and the furnishing of directory services to connected end nodes. The link between nodes may be permanent communications links, such as conventional cable connections or links, that are enabled only when needed, such as dial-up telephone connections.

End nodes are exemplified by devices, such as display terminals, intelligent workstations, printers, and the like, which do not provide routing or route selection or directory services to other nodes in the network. Collectively, the network nodes, the end nodes and the links between the nodes are referred to as network resources. The physical configuration and characteristics of the various nodes and links in a network are said to be the topology of the network.

For a user at one end node to exchange data with another user at another end node, a path, or route, must be set up through the network. The route will include the end node at which the first user is located (the source end node), the end node at which the second user is located (the destination end node), possibly one or more network nodes and the links, or transmission groups, which connect the nodes on the route. A transmission group is normally defined as a set of parallel links with similar characteristics that form a single logical link that has a higher capacity than each of the individual links in the group. For purposes of the following discussion, it should be assumed that the term transmission group can also contemplate a single physical link. The terms are used interchangeably in the following description.

In an ideal network, data provided by a first user is transmitted to a second user at no cost, with zero delays, with perfect reliability, and with complete security regardless of how many nodes and transmission groups might be included in the route between the two users. Unfortunately, real data communications networks lack these ideal characteristics. Varying amounts of delays may be introduced over different routes. Some types of transmission groups may cost more to use, or introduce more delay than others. The integrity of transmitted data may be protected better on some transmission groups than others. Other "imperfections" not even discussed above exist in a real network.

Because nodes and transmission groups in a real network possess different characteristics, it is a common practice to assign weights to both nodes and transmission groups, and to use the assigned weights in computing an optimal, or least, weight route through the network from one user to another. The weight generally reflects how closely a given node, or transmission group, meets a predetermined standard of performance. For example, if weights were to be assigned on the basis of delay characteristics alone, a high-delay transmission group would have a greater assigned weight than a low-delay transmission group.

Large "core" networks have been deployed by Telco and other service providers. These networks form the backbone of wide-area communications. These networks offer enormous bandwidths, typically 10s of Gigabits per second, per pipe.

However, core networks currently in use are based on previous-generation technologies such as SONET (Synchronous Optical Networking) and OTN (Optical Transport Network). These technologies lack fast provisioning of access bandwidth—Production optical wide area network (WAN) links can often take hours, or even days to provision. Because of the time required to provision these physical links, today's production optical wide area network (WAN) links are static, sized to fit peak loads based on worst-case scenario for peak network load. However, worst-case scenario for peak network load far exceeds normal loads on the optical wide area network (WAN). Therefore, resources allocated to the production optical wide area network (WAN) links often go underutilized.

Furthermore, previous-generation technologies such as SONET and OTN lack support for multiple link failures. That is, previous-generation technologies lack "data restoration."

SUMMARY

According to one embodiment of the present invention, the illustrative embodiments provide a computer implemented method for provisioning network resources within an application broker. A set of resource requests from applications executing on a set of clients is sorted to form a set of sorted resource requests. The set of sorted resource requests are sorted according to destinations of the set of resource requests. The set of sorted resource requests is aggregated to form a set of aggregated resource requests. Resource allocation is requested for each of the set of aggregated resource requests from a network border controller based on requirements of each of the set of set of aggregated resource requests. Responsive to requesting resource allocation for each of the set of aggregated resource requests, a set of allocated resources is received from the network border controller. Each of the set of allocated resources is based on requirements of each of the set of aggregated resource requests. For each of the set of aggregated resource requests, network transmissions network receptions are executed utilizing an associated one of the set of allocated resources.

According to one embodiment of the present invention, the illustrative embodiments provide a computer implemented method for sending traffic over a network. A set of resource requests from applications executing on a set of clients is sorted to form a set of sorted resource requests. The set of sorted resource requests are sorted according to destinations of the set of resource requests. The set of sorted resource requests is aggregated to form a set of aggregated resource requests. Resource allocation is requested for each of the set of aggregated resource requests from a network border controller based on requirements of each of the set of aggregated resource requests. Responsive to requesting resource allocation for each of the set of aggregated resource requests, a set of allocated resources is received from the network border controller. Each of the set of allocated resources is based on requirements of each of the set of aggregated resource requests. For each of the set of aggregated resource requests, network transmissions network receptions are executed utilizing an associated one of the set of allocated resources.

According to one embodiment of the present invention, the illustrative embodiments provide a computer program product for provisioning network resources within an application broker. A computer readable storage medium has computer readable program code embodied therewith. The computer readable program code comprises computer readable program code configured to sort a set of resource requests from applications executing on a set of clients to form a set of sorted resource requests, wherein the set of sorted resource requests are sorted according to destinations of the set of resource requests. The computer readable program code comprises computer readable program code configured to aggregate the set of sorted resource requests to form a set of aggregated resource requests. The computer readable program code comprises computer readable program code configured to request resource allocation for each of the set of aggregated resource requests from a network border controller based on requirements of each of the set of set of aggregated resource requests. The computer readable program code comprises computer readable program code, responsive to requesting resource allocation for each of the set of aggregated resource requests, configured to receive a set of allocated resources from the network border controller, wherein each of the set of allocated resources is based on requirements of each of the set of aggregated resource requests. The computer readable program code comprises computer readable program code, for each of the set of aggregated resource requests, configured to execute network transmissions and network receptions utilizing an associated one of the set of allocated resources.

According to one embodiment of the present invention, the illustrative embodiments provide an application broker. The application broker comprises a memory having computer readable program code embodied therewith for provisioning network resources within the application broker. The application broker comprises a bus connecting the memory to a processor. The application broker comprises a processor, wherein the processor executes the computer usable program code: to sort a set of resource requests from applications executing on a set of clients to form a set of sorted resource requests, wherein the set of sorted resource requests are sorted according to destinations of the set of resource requests; to aggregate the set of sorted resource requests to form a set of aggregated resource requests; to request resource allocation for each of the set of aggregated resource requests from a network border controller based on requirements of each of the set of set of aggregated resource requests; responsive to requesting resource allocation for each of the set of aggregated resource requests, to receive a set of allocated resources from the network border controller, wherein each of the set of allocated resources is based on requirements of each of the set of aggregated resource requests; and for each of the set of aggregated resource requests, to execute network transmissions and network receptions utilizing an associated one of the set of allocated resources.

DETAILED DESCRIPTION

Figure 1:
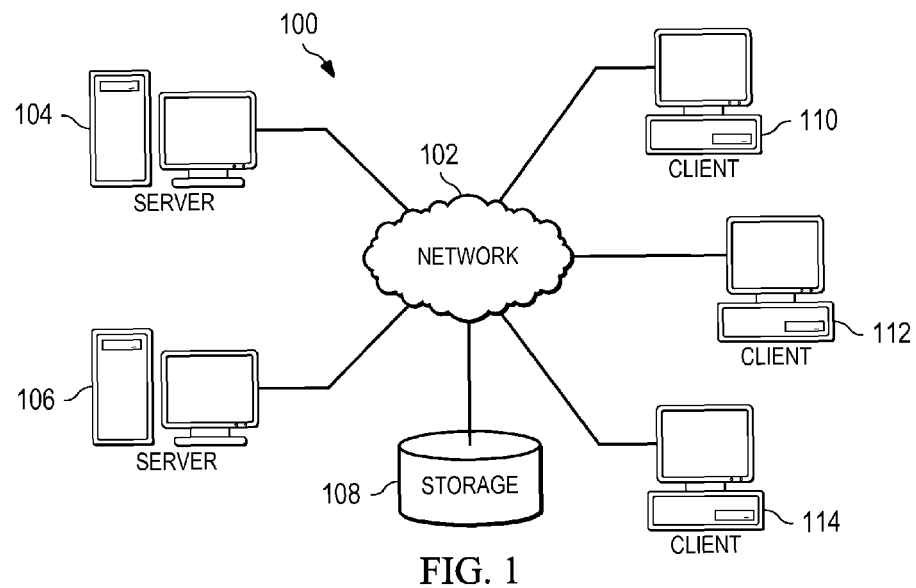
FIG. 1 is a pictorial representation of a network of data processing systems in which illustrative embodiments may be implemented

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
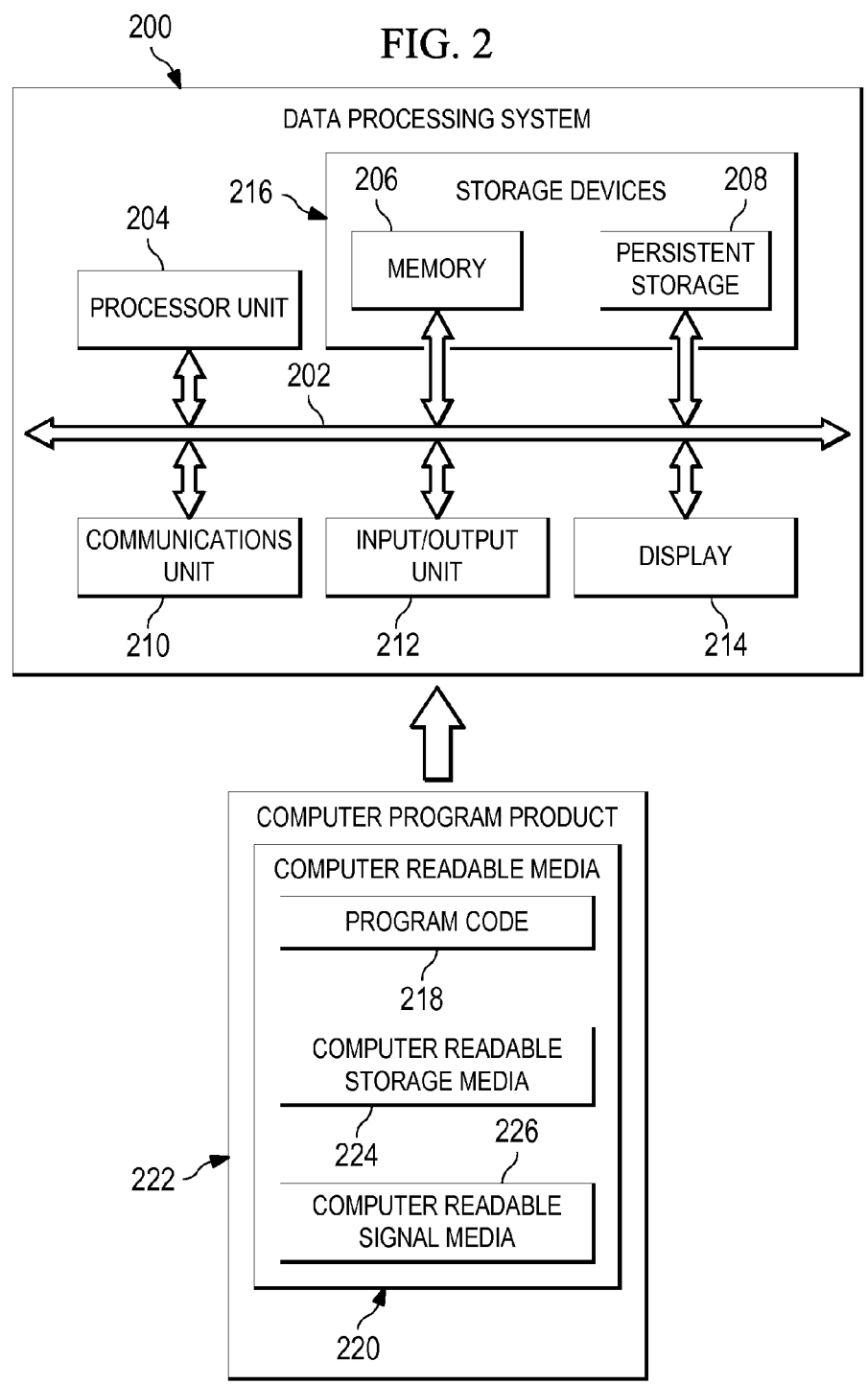
FIG. 2 is an illustration of a data processing system depicted in accordance with an illustrative embodiment.

Turning now to FIG. 2, an illustration of a data processing system is depicted in accordance with an illustrative embodiment. Data processing system 200 may be used to implement a virtual wide area network, such as network 102 of FIG. 1. In this illustrative example, data processing system 200 includes communications framework 202, which provides communications between processor unit 204, memory 206, persistent storage 208, communications unit 210, input/output (I/O) unit 212, and display 214. In these examples, communications frame work 204 may be a bus system.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or on a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications using either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications framework 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these examples, computer readable storage media 224 is a physical or tangible storage device used to store program code 218 rather than a medium that propagates or transmits program code 218. Computer readable storage media 224 is also referred to as a computer readable tangible storage device or a computer readable physical storage device. In other words, computer readable storage media 224 is a media that can be touched by a person.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured later or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications framework 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 206, or a cache, such as found in an interface and memory controller hub that may be present in communications framework 202.

Figure 3:
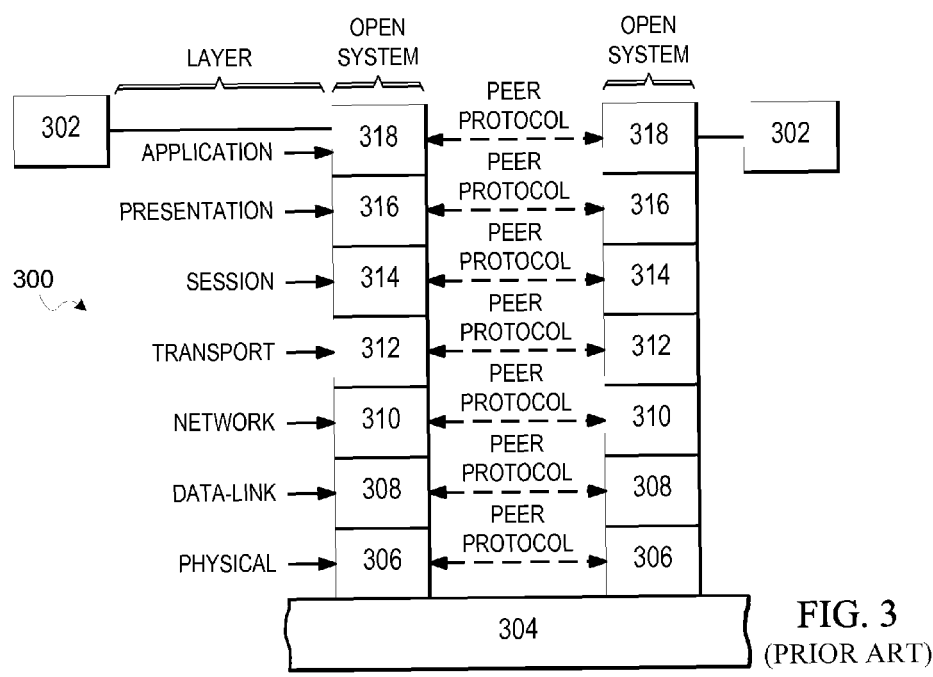
FIG. 3 is an Open Systems Interconnection model shown according to the prior art.

Referring now to FIG. 3, an Open Systems Interconnection model is shown according to the prior art. Open Systems Interconnection model (OSI model) 300 characterizes the functions of a communications system in terms of abstraction layers.

It is possible to replace the function of any of the layers with equivalent function implemented in a different manner without affecting the proper operation of the remaining layers of the system. The communication between one application, such as a software module or device, 302, and another module or device 302 over a communication medium 304, such as the cable, is described based on seven layers, each of which performs certain functions within the communication protocol. The lowest layer is the physical layer 306. The physical layer 306 involves the actual connections and the signaling to the communication medium 304.

The second layer is the data link layer 308. In this layer, the physical delivery of raw data between nodes on the network is accomplished. The physical signaling protocol, including link information, synchronization information, error correction information, protocol data unit (PDU) sizes, framing, etc., are conducted at this layer. In most networks, fundamental communication errors are detected and corrected here by retransmission or other means. Communication between a pair of nodes on the network depends on compatible implementation of data link layers. In summary, the link layer establishes, maintains, releases data links, and is used for error detection and physical flow control.

The third layer is the network layer 310. This layer controls the routing of information through the network, including addressing, network initialization, and the switching, segmenting, and formatting of the information. Sometimes acknowledgment of raw delivery data is accomplished at the network layer; sometimes, at the data link layer.

The next layer is the transport layer 312. This layer controls transparent data transfer, end-to-end control, multiplexing, mapping, and the like. Data delivery may imply reliable delivery, as opposed to a best effort to deliver the data that must be accounted for in the layers below the transport layer. Other classes of reliability may be selected as options as well. For example, at the transport layer, for reliability class 0, it is assumed that the data has been communicated in a reliable manner, and such things as the retransmission of missing data, reordering of the data delivered out of order, recovery from transmission errors, etc., has been corrected at or below the transport layer.

The fifth layer is the session layer 314. The session layer 314 uses the information from the transport layer to group pieces of data as associated with a given activity referred to as a session. Sessions occur between two entities at various locations on the network. At a given time, single nodes on the network may be involved in multiple sessions going to a plurality of other nodes, and many sessions may be multiplexed over the same communication medium. However, the session layer services provide for the end-to-end delivery of data associated with a given logical activity without interference by data from other activities.

Layer six is the presentation layer 316. The presentation layer 316 relates to the interface between the session layer 314 and the application layer 318 at layer seven. In the application layer 318, the actual data is applied to or received from the software module or device (302 or 302) at each end of the communication. The presentation layer 316 presents the data in a form suitable for use in the application layer 318 without compromising the network-related integrity of the session layer 314. The presentation layer 316 therefore relates to data interpretation, format, and code transformation, while the application layer relates to user application entities and management functions.

According to one embodiment of the present invention, a computer implemented method, a computer program product, and a data processing system are provided for provisioning network resources within an application broker. A set of resource requests from applications executing on a set of clients is provisioned to form a set of sorted resource requests, wherein the set of sorted resource requests are sorted according to destinations of the set of resource requests. The set of sorted resource requests is aggregated to form a set of aggregated resource requests. Resource allocation for each of the set of aggregated resource requests is requested from a network border controller based on requirements of each of the set of set of aggregated resource requests. Responsive to requesting resource allocation for each of the set of aggregated resource requests, a set of allocated resources is received from the network border controller. Each of the set of allocated resources is based on requirements of each of the set of aggregated resource requests. For each of the set of aggregated resource requests, network transmissions and network receptions are then executed utilizing an associated one of the set of allocated resources.

Figure 4:
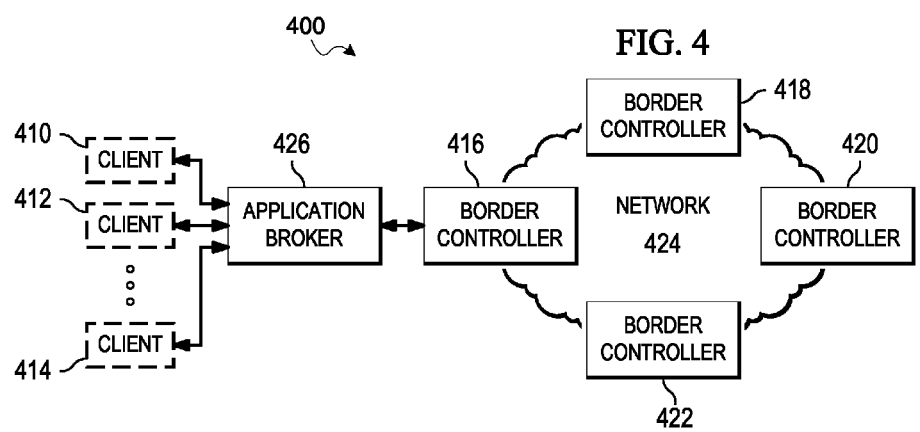
FIG. 4 is a network system having a standalone border controller shown according to an illustrative embodiment.

Referring now to FIG. 4, a network system having a standalone border controller is shown according to an illustrative embodiment. Network system 400 can be network data processing system 100 of FIG. 1. Network system 400 includes client 410, client 412, and client 414. Each of clients 410, 412 and 414 is a client computer such as one of client computers 110, 112, and 114 of FIG. 1.

Clients 410, 412 and 414 are connected to network 424 through border controller 416. Border controller 416 is a multifunction switch that can exert control over media streams and can be involved in setting up, conducting, and tearing down communication streams through network 424. Traffic sent from one of clients 410, 412, and 414 traverses network 424 on a stream or channel that has been provisioned by border controller 416. Other clients connected to network 424, not shown, can utilize other similar border controllers, such as border controller 418, border controller 420, and border controller 422.

Application broker 426 is interjacent between clients 410-414 and border controller 416. Application broker 426 is a maps requests for provisioning of network resources to available network resources under constraints. Application broker 426 can be a hardware system, a software system with adequate network connectivity, or a combination of hardware and software. Application broker 426 uniformly specifies client requirements for network services to border controller 416. Application broker 426 also communicates available network capabilities to clients 410-414.

Application broker 426 allows clients 410-414 to be agnostic to network 424. At the same time, Application broker 426 provides direct access for clients 410-414 to the capabilities of network 424. By allocating network resources on a periodic, fine-, medium-, or coarse-grain time boundaries, application broker 426 improves the utilization of network resources by clients 410-414.

Application broker 426 acts as an intermediary to clients 410-414 on one side, and network 424 on the other. On a periodic basis, application broker 426 aggregates and combines requests from multiple clients, such as clients 410-414. The time period can be, for example, but not limited to, 10 microseconds. Application broker 426 then invokes border controller 416 to obtain service to meet the aggregate requirements of clients 410-414 for the next time period.

Application broker 426 takes into account parameters such as request priority, expected/min/max latency of transfer, and expected/min bandwidth for fulfilling a given request. Application broker 426 sorts all requests by their destination address in the network topology. For each destination address, requests are aggregated together.

In each aggregated group, application broker 426 orders requests into a list, such that the highest priority requests are first. Then at each priority level, requests are further ordered by their latency requirements. Requests are further are further prioritized based on their bandwidth requirements. The aggregated groups are bundled together, and used to create resource request commands to be sent to the border controller.

Application broker 426 may decide that the ordered lists and sub-lists demand a set of resource request commands per destination address. Application broker 426 may decide that the entire list requires a single resource request command per destination address. The intelligence for making this decision is based on the knowledge of the available bandwidth, latency controls, and other network parameters offered by border controller 416 connection into network 424.

Application broker 426 sends commands to border controller 416, and receives responses from border controller 416. Border controller 416 can accept commands from application broker 426 thus allocating the requested resources, or there may be partial success, or complete failure to obtain resources. If border controller 416 accepts all commands from application broker 426, all the requirements for allocation are fulfilled. If border controller 416 has a partial success, then application broker 426 allows only those aggregated requests for which resources were allocated to proceed. Application broker 426 uses the remaining aggregated requests for which resources were not allocated as the starting point for aggregation in a next time period. If border controller 416 is unable to obtain any resources for any aggregated requests in this time period, then the entire set of requests is used as a starting point for aggregation in the next time period.

In addition to border controller 416, application broker 426 can also cooperate with other non-network elements. For example, but not limited to, application broker 426 may also communicate with, and provision services for, a connection manager in a virtual wavelength network.

Application broker 426 is a standalone broker. Application broker 426 can communicate with border controller 416 utilizing a private speak/response-based provisioning protocol. The private speak/response-based provisioning protocol is an upper layer communication, operating at layer 4 and above.

Figure 5:
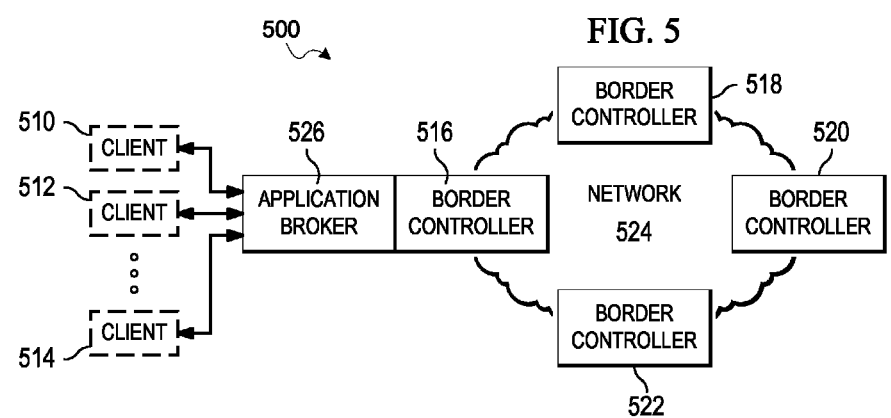
FIG. 5 is network system having a border controller-integrated application broker shown according to an illustrative embodiment.

Referring now to FIG. 5, a network system having a border controller-integrated application broker is shown according to an illustrative embodiment. Network system 500 can be network data processing system 100 of FIG. 1.

Network system 500 includes client 510, client 512, and client 514. Each of clients 510, 512 and 514 is a client computer such as one of client computers 110, 112, and 114 of FIG. 1.

Clients 510, 512 and 514 are connected to network 524 through border controller 516. Border controller 516 is a multifunction switch that can exert control over media streams and can be involved in setting up, conducting, and tearing down communication streams through network 524. Traffic sent from one of clients 510, 512, and 514 traverses network 524 on a stream or channel that has been provisioned by border controller 516. Other clients connected to network 524, not shown, can utilize other similar border controllers, such as border controller 518, border controller 520, and border controller 522.

Application broker 526 is integral with border controller 516. Application broker 526 is a maps requests for provisioning of network resources to available network resources under constraints. Application broker 526 can be a hardware system, a software system with adequate network connectivity, or a combination of hardware and software. Application broker 526 provides services similar to those of application broker 426 of FIG. 4.

Application broker 526 is a border controller-integrated application broker. Application broker 526 can communicate with border controller 516 utilizing a private speak/response-based provisioning protocol. The private speak/response-based provisioning protocol is an upper layer communication, operating at layer 4 and above. Application broker 526 operates as a broker for multiple client entities, such as multiple data centers.

Figure 6:
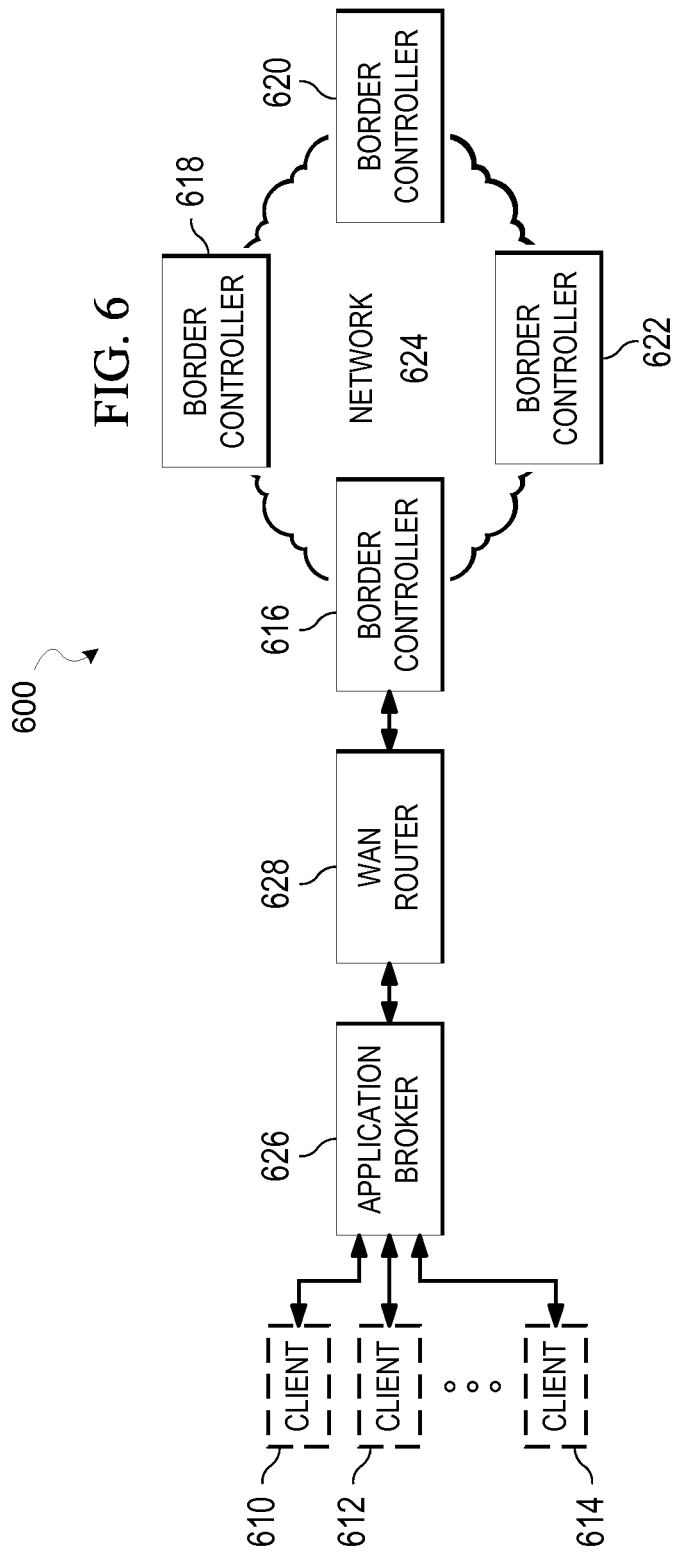
FIG. 6 is network system having a WAN router-integrated application broker shown according to an illustrative embodiment.

Referring now to FIG. 6, a network system having a WAN router-integrated application broker is shown according to an illustrative embodiment. Network system 600 can be a network data processing system 100 of FIG. 1

Network system 600 includes client 610, client 612, and client 614. Each of clients 610, 612 and 614 is a client computer such as one of client computers 110, 112, and 114 of FIG. 1.

Clients 610, 612 and 614 are connected to network 624 through border controller 616. Border controller 616 is a multifunction switch that can exert control over media streams and can be involved in setting up, conducting, and tearing down communication streams through network 624. Traffic sent from one of clients 610, 612, and 614 traverses network 624 on a stream or channel that has been provisioned by border controller 616. Other clients connected to network 624, not shown, can utilize other similar border controllers, such as border controller 618, border controller 620, and border controller 622.

Application broker 626 is integral with WAN router 628. Application broker 626 maps requests for provisioning of network resources to available network resources under constraints. Application broker 626 can be a hardware system, a software system with adequate network connectivity, or a combination of hardware and software. Application broker 626 provides services similar to those of application broker 426 of FIG. 4.

WAN router 628 is a wide area network router. WAN router 628 is a network device designed to forward packets to network 624. As opposed to routers used within an enterprise to keep subnetworks divided, referred to as "routers" or possibly "core routers," WAN router 628 is used to direct traffic to a network outside of the one they reside in such network 624.

Application broker 626 is a WAN router-integrated application broker operating at the boundary of a data center or client entity, such as client 610, client 612, and client 614. Application broker 626 communicates with the border controller 616 through a layer-3 operation.

Figure 7:
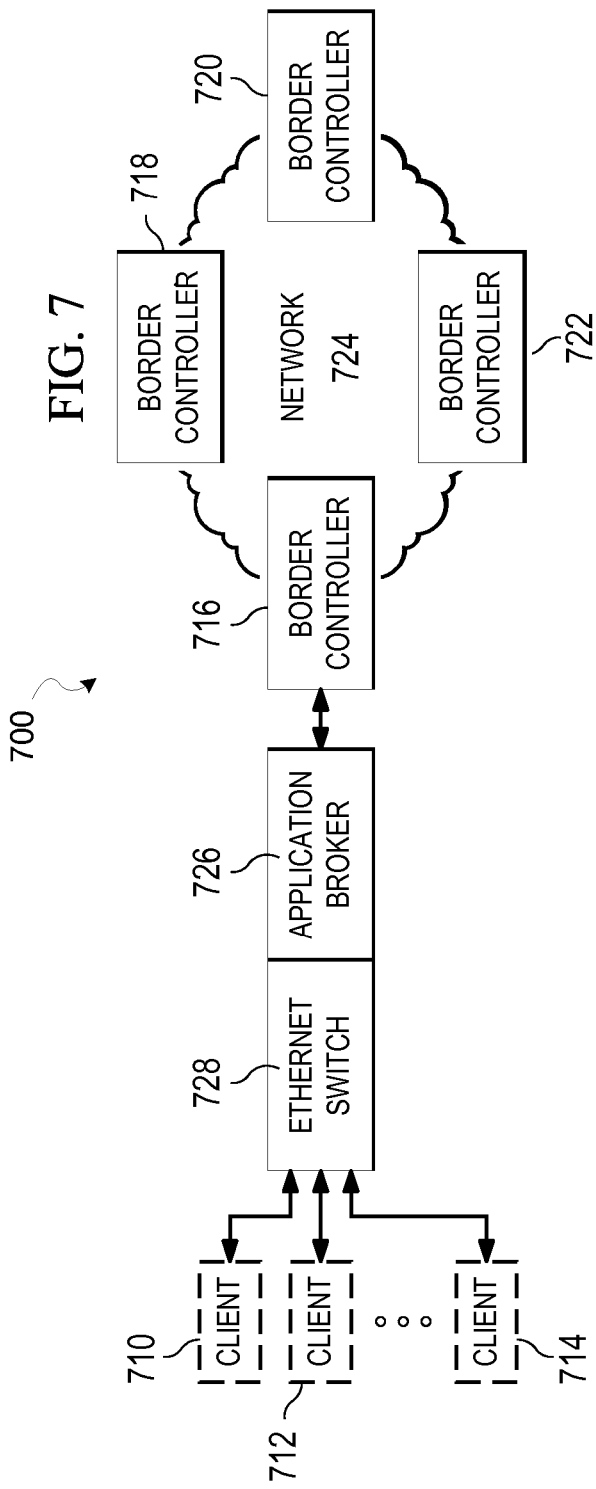
FIG. 7 is a network system having a Ethernet switch-integrated application broker shown according to an illustrative embodiment.

Referring now to FIG. 7, a network system having a Ethernet switch-integrated application broker is shown according to an illustrative embodiment. Network system 700 can be a cloud system, such as network system 700 includes client 710, client 712, and client 714. Each of clients 710, 712 and 714 is a client computer such as one of client computers 110, 112, and 114 of FIG. 1.

Clients 710, 712 and 714 are connected to network 724 through border controller 716. Border controller 716 is a multifunction switch that can exert control over media streams and can be involved in setting up, conducting, and tearing down communication streams through network 724. Traffic sent from one of clients 710, 712, and 714 traverses network 724 on a stream or channel that has been provisioned by border controller 716. Other clients connected to network 724, not shown, can utilize other similar border controllers, such as border controller 718, border controller 720, and border controller 722.

Application broker 726 is integral with Ethernet switch 728. Application broker 726 maps requests for provisioning of network resources to available network resources under constraints. Application broker 726 can be a hardware system, a software system with adequate network connectivity, or a combination of hardware and software. Application broker 726 provides services similar to those of application broker 426 of FIG. 4.

Ethernet switch 728 is a wide area network router. Ethernet switch 728 is a small hardware device that joins multiple computers together within one local area network (LAN). When application broker 726 is integral with Ethernet switch 728, application broker 726 behaves as an extension of Ethernet switch 728. All switching activity from clients 710, 712, and 714 is oblivious of network 724.

Application broker 726 is a Ethernet switch-integrated application broker. Utilizing a layer-2 communication, application broker 726 translates remote destination Ethernet frames for nodes outside the client, such as clients 710, 712, and 714, to proper core network commands.

Figure 8:
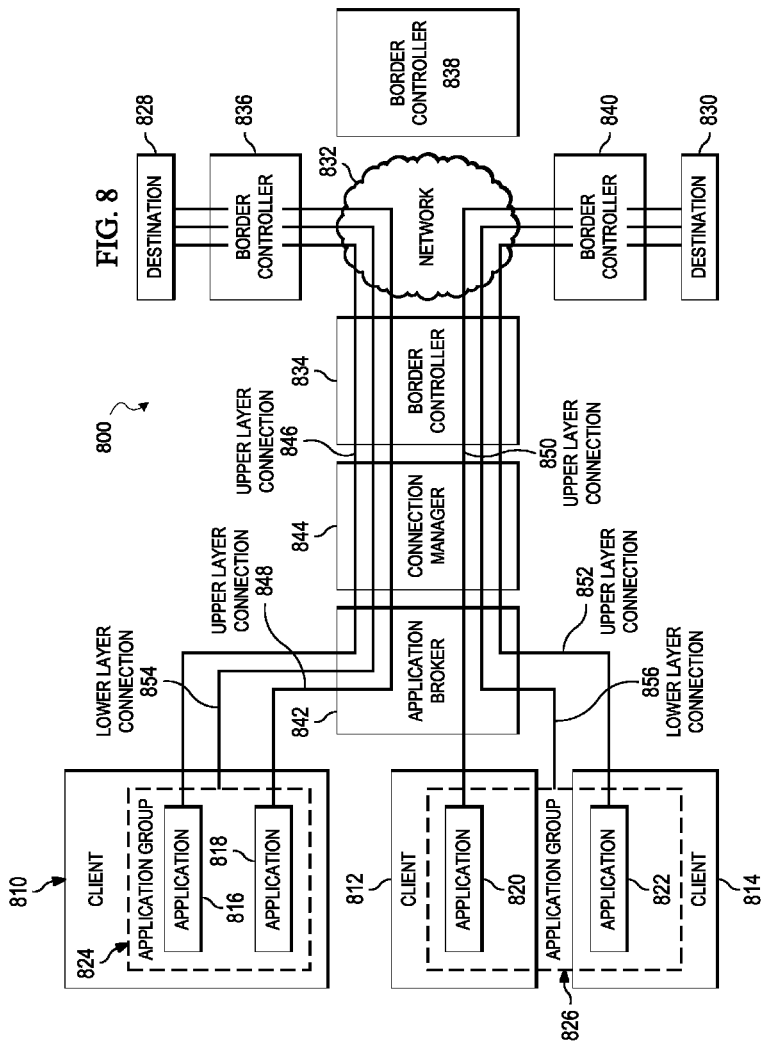
FIG. 8 is a network system having a standalone border controller integrated with a virtual wide area network connection manager shown according to an illustrative embodiment.

Referring now to FIG. 8, a network system having a standalone border controller integrated with a virtual wide area network connection manager is shown according to an illustrative embodiment. Network system 800 can be network data processing system 100 of FIG. 1.

Network system 800 includes client 810, client 812, and client 814. Each of clients 810, 812 and 814 is a client computer such as one of client computers 110, 112, and 114 of FIG. 1.

Application 816, 818, 820, and 822 are software designed to help a user perform specific tasks. Application 816, 818, 820, and 822 can be, for example, but are not limited to, enterprise software, accounting software, office suites, graphics software and media players.

Application groups 824 and 826 are sets of one or more applications, such as application 816, 818, 820, and 822. Application groups 824 and 826 include applications that are grouped according to destinations, such as destination 828 and 830. Destination 828 and 830 are nodes, switches routers, computers, or data processing systems to which application 816, 818, 820, and 822 direct traffic. Application 816 and application 818 have a common destination, destination 828, and are therefore grouped into a common application group, application group 824. Application 820 and application 822 have a common destination, destination 830, and are therefore grouped into a common application group, application group 826.

Clients 810, 812 and 814 are connected to network 832 through border controller 834. Border controller 834 is a multifunction switch that can exert control over media streams and can be involved in setting up, conducting, and tearing down communication streams through network 832. Traffic sent from one of clients 810, 812, and 814 traverses network 832 on a stream or channel that has been provisioned by border controller 834. Destination 828 and 830 connected to network 832 can utilize other similar border controllers, such as border controller 836, border controller 838, and border controller 840.

Application broker 842 is interjacent between clients 810-814 and connection manager 844. Application broker 842 maps requests for provisioning of network resources to available network resources under constraints. Application broker 842 can be a hardware system, a software system with adequate network connectivity, or a combination of hardware and software. Application broker 842 provides services similar to those of application broker 426 of FIG. 4.

Application 816 connects to destination 828 through upper layer connection 846. Application 818 connects to destination 828 through upper layer connection 848. Application 820 connects to destination 830 through upper layer connection 850. Application 822 connects to destination 830 through upper layer connection 852. Each of upper layer connections 846, 848, 850, and 852 is an abstraction of the functions of a communications system, and can include layers such as session layer 314 of FIG. 3, presentation layer 316 of FIG. 3, and application layer 318 of FIG. 3.

Virtual wide area network links are dynamic optical pipes that support multiple application connections from a source to a destination. The virtual wide area network link is configured on an optical wavelength. By maintaining a persistent upper layer state, the virtual wide area network link that is adjusted as the load over the link changes. The virtual wide area network link can be rerouted as faults occur or better routes are available, modified as quality of service requirements change and can be enabled or disabled, all while maintaining the upper layer state.

Each of upper layer connections 846, 848, 850, and 852 is a persistent upper layer connection. Network 832 allows a time window for changes to lower layer connections without upper layer connections 846, 848, 850, and 852 being marked as down. In one illustrative embodiment, the time window is a 50 millisecond time window.

Within the time window, each of upper layer connections 846, 848, 850, and 852 is persistent through various state changes to lower layer connections. For example, the various state changes can include, but are not limited to, bandwidth adjustment of an optical wavelength connection, rerouting of the optical wavelength connection, modification of the connection attributes, such as quality of service, for the optical wavelength connection, and enabling/disabling of the optical wavelength connection.

For each of application group 824 and application group 826, a single lower layer connection is created, connecting the application group to the destination. Application group 824 connects to destination 828 through lower layer connection 854. Application group 826 connects to destination 830 through lower layer connection 856. Each of lower layer connections 854 and 856 is an abstraction of the functions of a communications system, and can include layers such as physical layer 306 of FIG. 3, data link layer 308 of FIG. 3, network layer 310 of FIG. 3, and transport layer 312 of FIG.

3. Lower layer connection 854 and lower layer connection 856 are virtual connections. Lower layer connection 854 and lower layer connection 856 can undergo various state changes without affecting the persistent upper layer connections, such as upper layer connections 846, 848, 850, and 852. The various state changes can include, but are not limited to, bandwidth adjustment of an optical wavelength connection, rerouting of the optical wavelength connection, modification of the connection attributes, such as quality of service, for the optical wavelength connection, and enabling/disabling of the optical wavelength connection.

Connection manager 844 is software component that monitors and manages the performance of the dynamically provisioned optical wavelength connections between application groups 824, 826 and destinations 828, 830.

Connection manager 844 dynamically provisions lower layer connection 854 and lower layer connection 856 at an initial bandwidth. In one illustrative embodiment, lower layer connection 854 and lower layer connection 856 are optical wavelength connections of a bandwidth which prescribed at an initial value, determined through a historical average load for the optical wavelength connections. Connection manager 844 can then poll the utilization of the optical wavelength connection that has been allocated or a threshold can be set on the utilization.

Connection manager 844 can monitor lower layer connection 854 and lower layer connection 856 and adjusting the bandwidth of the virtual wide area network connection through multiple methods. For example, but not limited to the following, connection manager 844 can monitor TCP/IP data packets and determine bit rate; connection manager 844 can perform packet inspection to determine the application to classify the load characteristics; connection manager 844 can monitor TCP SYN/FIN packets to determine the number of connection/close attempts; and connection manager 844 can monitor for network connection creation attempts, such as CORONET creation attempts.

When the utilization of the initial bandwidth hits a threshold condition, connection manager 844 can destroy an existing lower layer connection, such as lower layer connection 854 or lower layer connection 856. Within the time window, connection manager 844 can then create a new lower layer connection, such as lower layer connection 854 or lower layer connection 856, with a new bandwidth. Creation of a new lower layer connection optimizes utilization of the total bandwidth available and is a more cost effective utilization of resources.

Additionally, within the time window, connection manager 844 can reroute an existing lower layer connection, such as lower layer connection 854 or lower layer connection 856, when a failure occurs in network 832. Rerouting an existing lower layer connection such as lower layer connection 854 or lower layer connection 856, is transparent to the upper layer connections, such as upper layer connections 846, 848, 850, and 852. Additionally if lower latency routes become available during the life of the lower layer connection, connection manager 844 can reroute the lower layer connection, transparent to the upper layer, in order to take advantage of the lower latency route.

Connection manager 844 can modify attributes of an existing lower layer connection, such as a quality of service latency requirement. Modification of the attributes of an existing lower layer connection can result in either or both of destroy/recreating an existing lower layer connection, and rerouting an existing lower layer connection.

Figure 9:
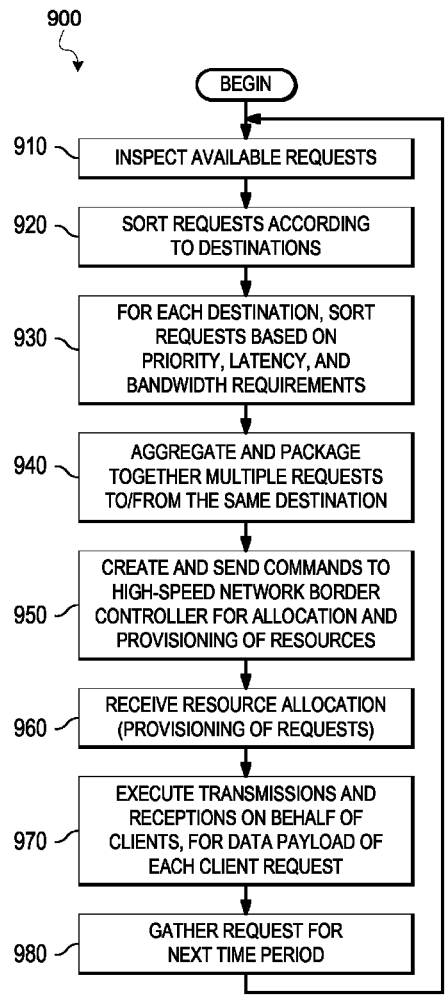
FIG. 9 is a flowchart for brokering and provisioning network requests is shown according to an illustrative embodiment

Referring now to FIG. 9, a flowchart for brokering and provisioning network requests is shown according to an illustrative embodiment. Process 900 is a software process, executing on a software component, such as application broker 426 of FIG. 4.

Process 900 begins at the initiation of a new time period by inspecting available requests (step 910). Each request is a request for provisioning of network services. The request can include certain requirements for service, including but not limited to, priority, latency, and bandwidth.

Process 900 then sorts the requests according to priority, latency and bandwidth on a per destination basis (step 920). That is, for each destination that service should be provisioned to, such as for example, but not limited to destination 828 and 830 of FIG. 8, process 900 sorts the requests according to priority, latency and bandwidth. Requests for separate destinations are sorted separately, so that a sorted hierarchy is obtained for each destination.

Responsive to sorting the requests, process 900 aggregates and packages together multiple requests on a per destination basis (step 930). Process 900 takes into account parameters such as request priority, expected/min/max latency of transfer, and expected/min bandwidth for fulfilling a given request. Process 900 sorts all requests by their destination address in the network topology. For each destination address, requests are aggregated together.

In each aggregated group, process 900 orders requests into a list, such that the highest priority requests are first. Then at each priority level, requests are further ordered by their latency requirements. Requests are further prioritized based on their bandwidth requirements. The aggregated groups are bundled together, and used to create resource request commands to be sent to the border controller.

Process 900 may decide that the ordered lists and sub-lists demand a set of resource request commands per destination address. Process 900 may decide that the entire list requires a single resource request command per destination address. The intelligence for making this decision is based on the knowledge of the available bandwidth, latency controls, and other network parameters offered by a border controller connection into the network.

Process 900 then creates and sends commands to a border controller for allocation and provisioning or resources according to the aggregated requests (step 940). The border controller can be border controller 416 of FIG. 4. The command can be a command for the provisioning of network resources according to the sorted requests. The border controller can accept commands from process 900, thus allocating the requested resources, or there may be partial success, or complete failure to obtain resources.

Process 900 receives resource allocation from the border controller (step 950). If the border controller accepts all commands from process 900, all the requirements for allocation are fulfilled. If the border controller has a partial success, then process 900 allows only those aggregated requests for which resources were allocated to proceed. Process 900 uses the remaining aggregated requests for which resources were not allocated as the starting point for aggregation in a next time period. If the border controller is unable to obtain any resources for any aggregated requests in this time period, then the entire set of requests is used as a starting point for aggregation in the next time period Responsive to receiving the resource allocation from the border controller, process 900 executes transmission of the sorted requests on behalf of the clients, for data payload of each client request (step 950).

Process 900 then begins to gather requests for the next time period (step 980). Process 900 then iterates back to step 910 to aggregate the new requests. As stated before, if the border controller previously had a partial success, then the remaining aggregated requests for which resources were not allocated as the starting point for aggregation in a next time period. If the border controller was previously unable to obtain any resources for any aggregated requests in this time period, then the entire set of requests is used as a starting point for aggregation in the next time period Thus, illustrative embodiments of the present invention provide a computer implemented method, computer system, and computer program product for provisioning network resources within an application broker. A set of resource requests from applications executing on a set of clients is provisioned to form a set of sorted resource requests, wherein the set of sorted resource requests are sorted according to destinations of the set of resource requests. The set of sorted resource requests is aggregated to form a set of aggregated resource requests. Resource allocation for each of the set of aggregated resource requests is requested from a network border controller based on requirements of each of the set of set of aggregated resource requests. Responsive to requesting resource allocation for each of the set of aggregated resource requests, a set of allocated resources is received from the network border controller. Each of the set of allocated resources is based on requirements of each of the set of aggregated resource requests. For each of the set of aggregated resource requests, network transmissions and network receptions are then executed utilizing an associated one of the set of allocated resources.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for provisioning network resources within an application broker computer, the computer implemented method comprising:

sorting, by the application broker computer, a set of resource requests from applications executing on a plurality of client devices to destinations via a network to form a set of sorted resource requests, wherein the set of sorted resource requests are sorted according to the destinations of the set of resource requests;

responsive to the application broker computer sorting the set of resource requests to form the set of sorted resource requests, sorting, by the application broker computer, the set of sorted resource requests based on a network priority requirement, a network latency requirement, and a bandwidth requirement for each destination of the set of resource requests;

aggregating, by the application broker computer, the set of sorted resource requests to form a plurality of aggregated resource requests;

requesting, by the application broker computer, allocation of a different set of virtual network communication links for each of the plurality of aggregated resource requests from a network border controller switch that connects the plurality of client devices to the network via the application broker computer based on requirements of each of the plurality of aggregated resource requests, wherein the network border controller switch sets up, controls, and tears down the different sets of virtual network communication links, and wherein traffic sent from the plurality of client devices traverses the network via the different sets of virtual network communication links to the destinations, and wherein the application broker computer specifies the requirements of each of the plurality of aggregated resource requests to the network border controller switch, and wherein the requesting, by the application broker computer, the allocation of the different set of virtual network communication links for each of the plurality of aggregated resource requests from the network border controller switch further comprises:

requesting, by the application broker computer, the allocation of the different set of virtual network communication links for each of the plurality of aggregated resource requests from the network border controller switch utilizing a private request/response based provisioning protocol;

responsive to the application broker computer requesting the allocation of the different set of virtual network communication links for each of the plurality of aggregated resource requests from the network border controller switch, receiving, by the application broker computer, the different set of allocated virtual network communication links for each of the plurality of aggregated resource requests from the network border controller switch based on the requirements of each of the plurality of aggregated resource requests; and executing, by the application broker computer, network traffic transmissions to the destinations and network traffic receptions from the destinations on behalf of the plurality of client devices utilizing an associated one of the different sets of allocated virtual network communication links for an associated one of the plurality of aggregated resource requests.

2. The computer implemented method of claim 1, wherein the application broker computer further comprises:

a standalone application broker computer operating at or above a layer-4 of the network.

3. The computer implemented method of claim 1, wherein the receiving, by the application broker computer, the different set of allocated virtual network communication links for each of the plurality of aggregated resource requests from the network border controller switch further comprises:

receiving, by the application broker computer, the different set of allocated virtual network communication links for each of the plurality of aggregated resource requests from the network border controller switch utilizing the private request/response based provisioning protocol.

4. The computer implemented method of claim 1, wherein the application broker computer includes the network border controller switch operating at or above a layer-4 of the network, and wherein the application broker computer operates on behalf of multiple data centers.

5. The computer implemented method of claim 1, wherein the application broker computer includes a wide area network router that directs the traffic to the network from an outside network, and wherein the application broker computer including the wide area network router operates at a boundary of a data center, and wherein the application broker computer including the wide area network router communicates with the network border controller switch.

6. The computer implemented method of claim 1, wherein the application broker computer includes an Ethernet switch that joins the plurality of client devices together within one local area network, and wherein the application broker computer including the Ethernet switch translates remote destination Ethernet frames to commands of the network.

7. A computer implemented method for sending traffic over a network, the computer implemented method comprising:
sorting, by an application broker computer, a set of resource requests from applications executing on a plurality of client devices to destinations via the network to form a set of sorted resource requests, wherein the set of sorted resource requests are sorted according to the destinations of the set of resource requests;
responsive to the application broker computer sorting the set of resource requests to form the set of sorted resource requests, sorting, by the application broker computer, the set of sorted resource requests based on a network priority requirement, a network latency requirement, and a bandwidth requirement for each destination of the set of resource requests;
aggregating, by the application broker computer, the set of sorted resource requests to form a plurality of aggregated resource requests;
requesting, by the application broker computer, allocation of a different set of virtual network communication links for each of the plurality of aggregated resource requests from a virtual wide area network connection manager based on requirements of each of the plurality of aggregated resource requests, wherein the virtual wide area network connection manager sets up, controls, and tears down the different sets of virtual network communication links, and wherein the traffic sent from the plurality of client devices traverses the network via the different sets of virtual network communication links to the destinations, and wherein the application broker computer specifies the requirements of each of the plurality of aggregated resource requests to the virtual wide area network connection manager, and wherein the requesting, by the application broker computer, the allocation of the different set of virtual network communication links for each of the plurality of aggregated resource requests from the virtual wide area network connection manager further comprises:
requesting, by the application broker computer, the allocation of the different set of virtual network communication links for each of the plurality of aggregated resource requests from the virtual wide area network connection manager utilizing a private request/response based provisioning protocol;
responsive to the application broker computer requesting the allocation of the different set of virtual network communication links for each of the plurality of aggregated resource requests from the virtual wide area network connection manager, receiving, by the application broker computer, the different set of allocated virtual network communication links for each of the plurality of aggregated resource requests from the virtual wide area network connection manager based on the requirements of each of the plurality of aggregated resource requests; and
executing, by the application broker computer, network traffic transmissions to the destinations and network traffic receptions from the destinations on behalf of the plurality of client devices utilizing an associated one of the different sets of allocated virtual network communication links for an associated one of the plurality of aggregated resource requests.

8. A computer program product for provisioning network resources within an application broker computer, the computer program product comprising:
a computer readable storage device having computer readable program code embodied therewith, the computer readable program code comprising:
computer readable program code configured to sort, by the application broker computer, a set of resource requests from applications executing on a plurality of client devices to destinations via a network to form a set of sorted resource requests, wherein the set of sorted resource requests are sorted according to the destinations of the set of resource requests;
computer readable program code, responsive to the application broker computer sorting the set of resource requests to form the set of sorted resource requests, configured to sort, by the application broker computer, the set of sorted resource requests based on a network priority requirement, a network latency requirement, and a bandwidth requirement for each destination of the set of resource requests;
computer readable program code configured to aggregate, by the application broker computer, the set of sorted resource requests to form a plurality of aggregated resource requests;
computer readable program code configured to request, by the application broker computer, allocation of a different set of virtual network communication links for each of the plurality of aggregated resource requests from a network border controller switch that connects the plurality of client devices to the network via the application broker computer based on requirements of each of the plurality of aggregated resource requests, wherein the network border controller switch sets up, controls, and tears down the different sets of virtual network communication links, and wherein traffic sent from the plurality of client devices traverses the network via the different sets of virtual network communication links to the destinations, and wherein the application broker computer specifies the requirements of each of the plurality of aggregated resource requests to the network border controller switch, and wherein the computer readable program code configured to request, by the application broker computer, the allocation of the different set of virtual network communication links for each of the plurality of aggregated resource requests from the virtual wide area network connection manager further comprises:

computer readable program code configured to request, by the application broker computer, the allocation of the different set of virtual network communication links for each of the plurality of aggregated resource requests from the virtual wide area network connection manager utilizing a private request/response based provisioning protocol;

computer readable program code, responsive to the application broker computer requesting the allocation of the different set of virtual network communication links for each of the plurality of aggregated resource requests from the network border controller switch, configured to receive, by the application broker computer, the different set of allocated virtual network communication links for each of the plurality of aggregated resource requests from the network border controller switch based on the requirements of each of the plurality of aggregated resource requests; and computer readable program code configured to execute, by the application broker computer, network traffic transmissions to the destinations and network traffic receptions from the destinations on behalf of the plurality of client devices utilizing an associated one of the different sets of allocated virtual network communication links for an associated one of the plurality of aggregated resource requests.

9. The computer program product of claim 8, wherein the application broker computer further comprises:
a standalone application broker computer operating at or above a layer-4 of the network.

10. The computer program product of claim 8, wherein the computer readable program code configured to receive, by the application broker computer, the different set of allocated virtual network communication links for each of the plurality of aggregated resource requests from the network border controller switch further comprises:
computer readable program code configured to receive, by the application broker computer, the different set of allocated virtual network communication links for each of the plurality of aggregated resource requests from the network border controller switch utilizing the private request/response based provisioning protocol.

11. The computer program product of claim 8, wherein the application broker computer includes the network border controller switch operating at or above a layer-4 of the network, and wherein the application broker computer operates on behalf of multiple data centers.

12. The computer program product of claim 8, wherein the application broker computer includes a wide area network router that directs the traffic to the network from an outside network, and wherein the application broker computer including the wide area network router operates at a boundary of a data center, and wherein the application broker computer including the wide area network router communicates with the network border controller switch.

13. The computer program product of claim 8, wherein the application broker computer includes an Ethernet switch that joins the plurality of client devices together within one local area network, and wherein the application broker computer including the Ethernet switch translates remote destination Ethernet frames to commands of the network.

14. An application broker computer comprising:
a memory having computer usable program code embodied therewith for provisioning network resources within the application broker; and
a bus connecting the memory to a processor, wherein the processor executes the computer usable program code:
to sort a set of resource requests from applications executing on a plurality of client devices to destinations via a network to form a set of sorted resource requests, wherein the set of sorted resource requests are sorted according to the destinations of the set of resource requests; responsive to sorting the set of resource requests to form the set of sorted resource requests, to sort the set of sorted resource requests based on a network priority requirement, a network latency requirement, and a bandwidth requirement for each destination of the set of resource requests; to aggregate the set of sorted resource requests to form a plurality of aggregated resource requests; to request, by the application broker computer, allocation of a different set of virtual network communication links for each of the plurality of aggregated resource requests from a network border controller switch that connects the plurality of client devices to the network via the application broker computer based on requirements of each of the plurality of aggregated resource requests, wherein the network border controller switch sets up, controls, and tears down the different sets of virtual network communication links, and wherein traffic sent from the plurality of client devices traverses the network via the different sets of virtual network communication links to the destinations, and wherein the application broker computer specifies the requirements of each of the plurality of aggregated resource requests to the network border controller switch, and wherein the processor executing the computer usable program code to request the allocation of the different set of virtual network communication links for each of the plurality of aggregated resource requests from the network border controller switch further comprises the processor executing the computer usable program code to request the allocation of the different set of virtual network communication links for each of the plurality of aggregated resource requests from the network border controller switch utilizing a private request/response based provisioning protocol; responsive to requesting the allocation of the different set of virtual network communication links for each of the plurality of aggregated resource requests from the network border controller switch, to receive the different set of allocated virtual network communication links for each of the plurality of aggregated resource requests from the network border controller switch based on the requirements of each of the plurality of aggregated resource requests; and to execute network traffic transmissions to the destinations and network traffic receptions from the destinations on behalf of the plurality of client devices utilizing an associated one of the different sets of allocated virtual network communication links for an associated one of the plurality of aggregated resource requests.

15. The application broker computer of claim 14, wherein the application broker computer further comprises:
a standalone application broker computer operating at or above a layer-4 of the network.

16. The application broker computer of claim 14, wherein the processor executing the computer usable program code to receive the different set of allocated virtual network communication links for each of the plurality of aggregated resource requests from the network border controller switch further comprises the processor executing the computer usable program code:
to receive the different set of allocated virtual network communication links for each of the plurality of aggregated resource requests from the network border controller switch utilizing the private request/response based provisioning protocol.

17. The application broker computer of claim 14, wherein the application broker computer includes the network border controller switch operating at or above a layer-4 of the network, and wherein the application broker computer operates on behalf of multiple data centers.

18. The application broker computer of claim 14, wherein the application broker computer includes a wide area network router that directs the traffic to the network from an outside network, and wherein the application broker computer including the wide area network router operates at a boundary of a data center, and wherein the application broker computer including the wide area network router communicates with the network border controller switch.

* * * * *